United States Patent [19]

Possobom

[11] Patent Number: 5,431,244
[45] Date of Patent: Jul. 11, 1995

[54] ANTI-THEFT SHIFT-LOCK FOR AUTOMOTIVE VEHICLES

[75] Inventor: José D. Possobom, Sao Paulo, Brazil

[73] Assignee: Equipamentos Clark Ltda., Valinhos, Brazil

[21] Appl. No.: 256,459

[22] PCT Filed: May 3, 1993

[86] PCT No.: PCT/BR93/00017

§ 371 Date: Jul. 7, 1994

§ 102(e) Date: Jul. 7, 1994

[51] Int. Cl.$^6$ .................................................. B60R 25/10
[52] U.S. Cl. ...................... 180/287; 70/247; 307/10.4; 340/426
[58] Field of Search ................ 180/287; 70/245, 247; 292/144; 307/10.4; 340/426, 456

[56] References Cited

U.S. PATENT DOCUMENTS

| | | | |
|---|---|---|---|
| 3,718,202 | 2/1973 | Brock | 180/114 |
| 3,788,422 | 1/1974 | Bowler | 180/114 |
| 3,796,889 | 3/1974 | Fradkin et al. | 307/10 AT |
| 4,231,241 | 11/1980 | Lipski | 70/195 |
| 4,449,385 | 5/1984 | Thirion et al. | 70/277 |
| 4,884,654 | 12/1989 | Durigon | 180/287 |
| 4,909,089 | 3/1990 | Morello et al. | 307/40 |
| 5,179,868 | 1/1993 | Thibeault | 74/411.5 |

*Primary Examiner*—Kenneth R. Rice
*Attorney, Agent, or Firm*—Ladas & Parry

[57] ABSTRACT

An anti-theft system for automotive vehicles equipped with mechanical transmission. A mechanical-electric-electronic device capable of locking the transmission in reverse mesh, comprises: a) one element denominated locking device (1), coupled to the transmission case, containing a blocking pin (3) which actuates in the transmission control system, displaced by actuation of a solenoid (1) which is commanded by relays (5) b) one keyboard (10) used by the owner of the vehicle to command the releasing or the locking of the system through a personal and programmable code number e c) one element denominated electronic central (6) which can be installed close with the locking device or close with the keyboard, basically composed of a micro-controller (7) which receives information from the keyboard (10) conducted by means of wire through a duct (9) coupled to the shift lever and from two more signals, external to the system, also conducted by wires (8) (ignition and reverse light switch) which, by recognition of these signals, release the keyboard (10) to accept the code of the owner and, all items of information being correct, sends a codified electric signal to the solenoid (4), which will command the advance or retrieval of the system blocking pin (3).

12 Claims, 5 Drawing Sheets

ANTI-THEFT SHIFT-LOCK FOR AUTOMOTIVE VEHICLES

This invention refers to an anti-theft system for automotive vehicles equipped with mechanical transmission. This system is intended to lock the transmission when it is meshed in reverse, thus making it difficult to tow the vehicle and obstructing its normal operation.

At the present time, because of the large number of vehicle stealing, a number of gadgets for protection and security has been used, such as: alarms, padlocks, chains, steering wheel locks, clutch pedal locks, etc. These contrivances render the stealing more difficult, thus discouraging theft.

Also mechanical contrivances that actuate on the transmission shift lever are well known and widely used, obstructing shift lever movement, thus locking the transmission in a selected mesh. These are contrivances equipped with several types of mechanical lock (a padlock, for instance) adapted or mounted on the outside of the transmission case, more precisely on the lever itself, above the floor of the vehicle.

These gadgets are of simple adaptation and easily installed, but not efficacious, because they can be removed or easily violated, because of free access. The mechanical locks used in such systems, equipped with a key or a padlock, are easily violated with the use of falsified keys, or even by breaking.

Those which use electronic alarms, or similar systems, can also be easily violated: once the horn or the headlights have been disconnected, no further signal is possible to alert the stealing of the vehicle.

The objective of this invention is to provide a mechanical-electrical-electronic device capable of locking the transmission in reverse, and which can be mounted inside the transmission, or onto the transmission case, barring easy access and possible violation, besides providing an actuating system that makes it impossible the unlocking of the transmission by a person other than the owner of the vehicle himself. Such a system consists of the actuation of a device (with a blocking pin inside of the transmission) through an electronic central, controlled by a keyboard, of easy access for the user, by means of a personal code number.

Such an objective was attained, in accordance with the invention, because the mounting of the locking device on the transmission, under the vehicle floor, eliminates the problem of easy access to the system itself, and the use of a personal code number makes it impossible any violation of the actuating system, since only the use of the right code number will make it possible to unlock the transmission.

It must be said that there are vehicles the transmissions of which are not positioned under the floor, but in other positions, also of difficult access.

The system is composed of:
a) a locking device positioned on the control system of the transmission;
b) an electronic central that receives and transmits necessary information to actuate the locking device; and,
c) a keyboard which the user operates to control the locking or the unlocking of the shift lock system.

The shift lock device consists of the actuation of a solenoid capable of actuating a mechanical locking system, based on the positioning of an actuating pin which, introduced in a hole in the reverse shift bar or fork, will block its course in any direction. With the reverse in mesh, the pin will also actuate on the end of the shift bar or on the face of the shift fork, thus barring the course back into the out of mesh position. The area of the actuation of the pin depends on the model of the transmission, since each transmission has a well differentiated control system. The electronic central will receive information from the keyboard, conducted by wiring inside of a duct coupled to the shift lever, and from two more signals external to the system, also conducted by wiring: ignition (engine off) and reverse light switch (reverse in mesh). Without the correct recognizance of these items of information, the central will not allow the operation of the system. If the information is correct, an electrical signal will be sent which, under the action of the solenoid, will command the forward course or the retrieval of the actuating pin. This central must have an outlet for an alarm, for the purpose of actuating it in case of an attempt to violate the system. The outlet can be mounted on either of two equally safe areas: on the shift lever knob, near the keyboard, or on the locking device, near the solenoid and the actuating pin. The keyboard is located on the shift lever knob and sends a code to the electronic central to lock or unlock the shifting control system of the transmission, by the use of a programmable personal code number. When the two signals outside of the system (ignition and reverse light switch) are stable, in adequate levels, the electronic central will release the keyboard to receive the user code number.

These, besides other features and advantages of the device of the invention, will be further clarified, as an example of the operation is described. The non-limiting example is provided as represented in the designs enclosed, in which.

There may exist other actuating diagrams, depending on the transmission model, besides the ones shown in this figure; these are only non-limiting examples.

The invention is demonstrated in an application in which the electronic central is coupled onto the locking device, as already mentioned, but it may also be mounted in other positions, such as on the knob, by means of simple adaptations.

The adaptation of the locking device can be made on any automotive vehicle transmission through minor changes in the transmission case, or in its cover, or in its control tower. In the same way, small changes in the transmission shift lever will make it possible to mount the knob (jointly with the keyboard, wiring and duct) on any automotive vehicle transmission, thus making it possible the installation of the anti-theft shift lock on any vehicle.

Figure 1:
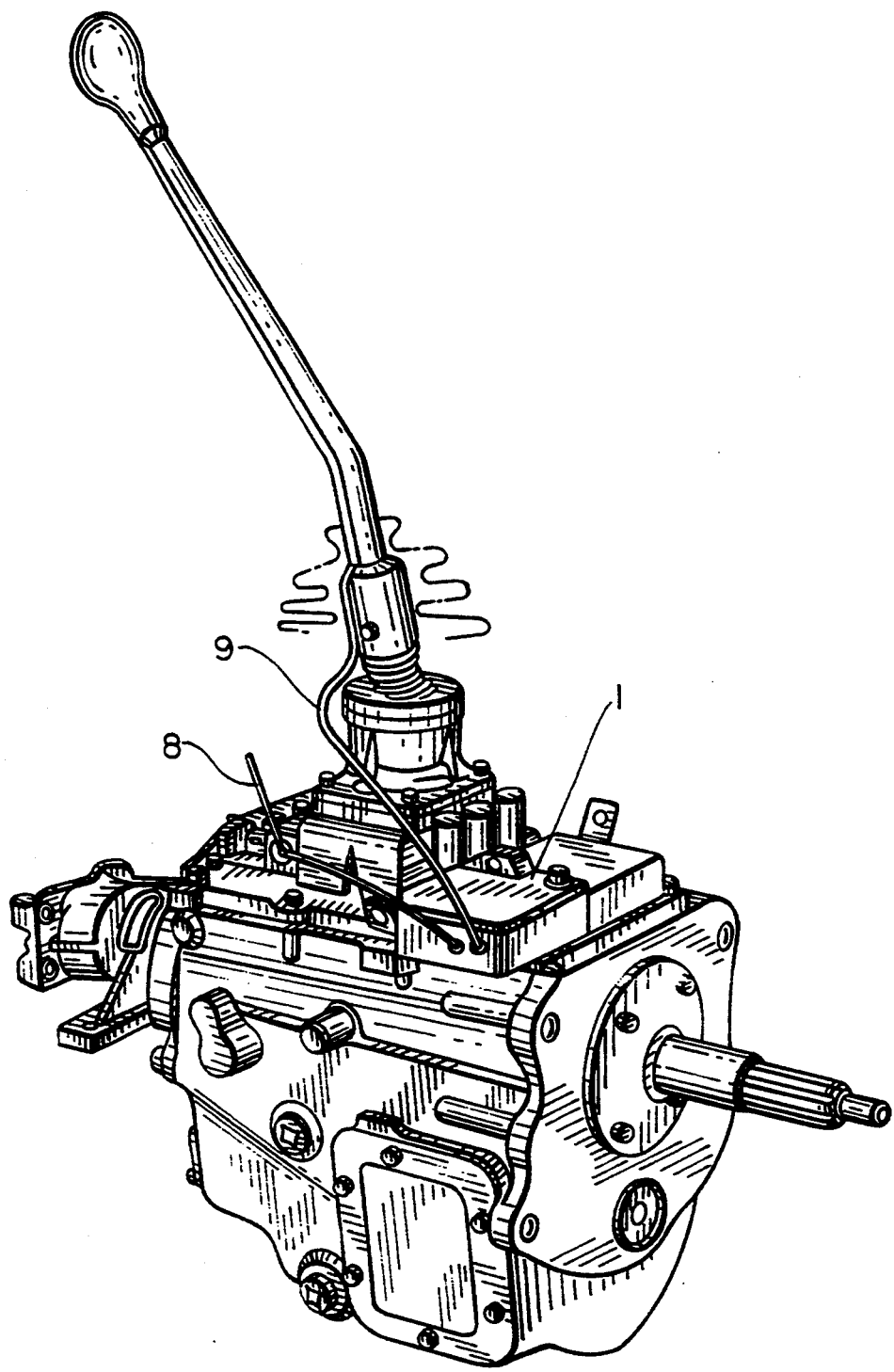
FIG. 1 shows the localization of the locking device on a given transmission case.

In the example provided, the locking device 1, as in FIG. 1, is coupled to the control cover of a transmission. It should be noticed that when installed on the vehicle, the device will be positioned under the floor, and only the shift lever is above the floor level. That renders access to this device very restricted, thus making it very difficult to be violated.

Figure 2:
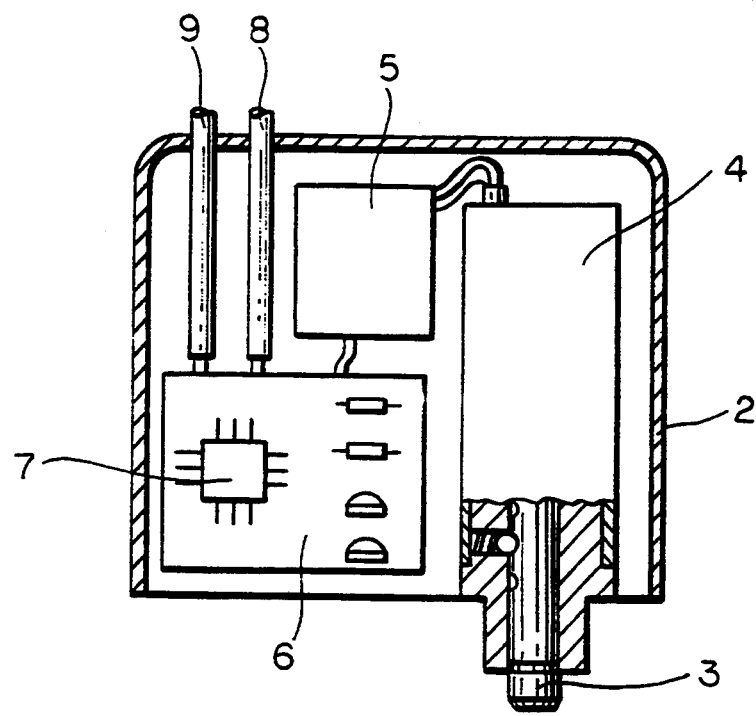
FIG. 2 is a longitudinal cut view of the locking device, also showing the coupled electronic central.

The locking device, as per FIG. 2, consists basically of a totally closed box 2, an actuating pin 3, mounted inside of a double action solenoid 4, and relays 5 which command the solenoid. Jointly with the blocking device, inside the box, there is the electronic central which receives all the necessary information through the wiring 9 and the wires 8 which conduct information on the status of the vehicle, ignition and reverse light switch wires.

The function of the pin 3 is to actuate on the control system of the transmission so as to make it impossible to shift out of reverse when the system is on. For that purpose, it has two positions: retrieved (inside the solenoid) or advanced (actuating on the transmission control) and is actuated by the double action solenoid. The solenoid 4 is said to be of double action because it commands the actuating pin 3 forward and back, that is, it consists of two internal coils which advance or retrieve the pin as requested. The relays 5 control the signals to the respective coils.

The electronic central is essentially composed of a micro-controller 7, programmed in RAM-ROM, which controls the whole system, from the release of the keyboard to receive the code number, the release of the keyboard for the reprogramming of the personal code number, the information to a LED 16 which monitors the operation of the system, to the release of the signal for the advance or retrieval of the pin.

Figure 5:
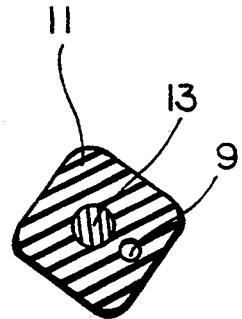
FIG. 5 is a section is a crosswise cut of the knob.
Figure 6:
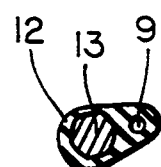
FIG. 6 is a section is a crosswise cut of the shift lever.
Figure 4:
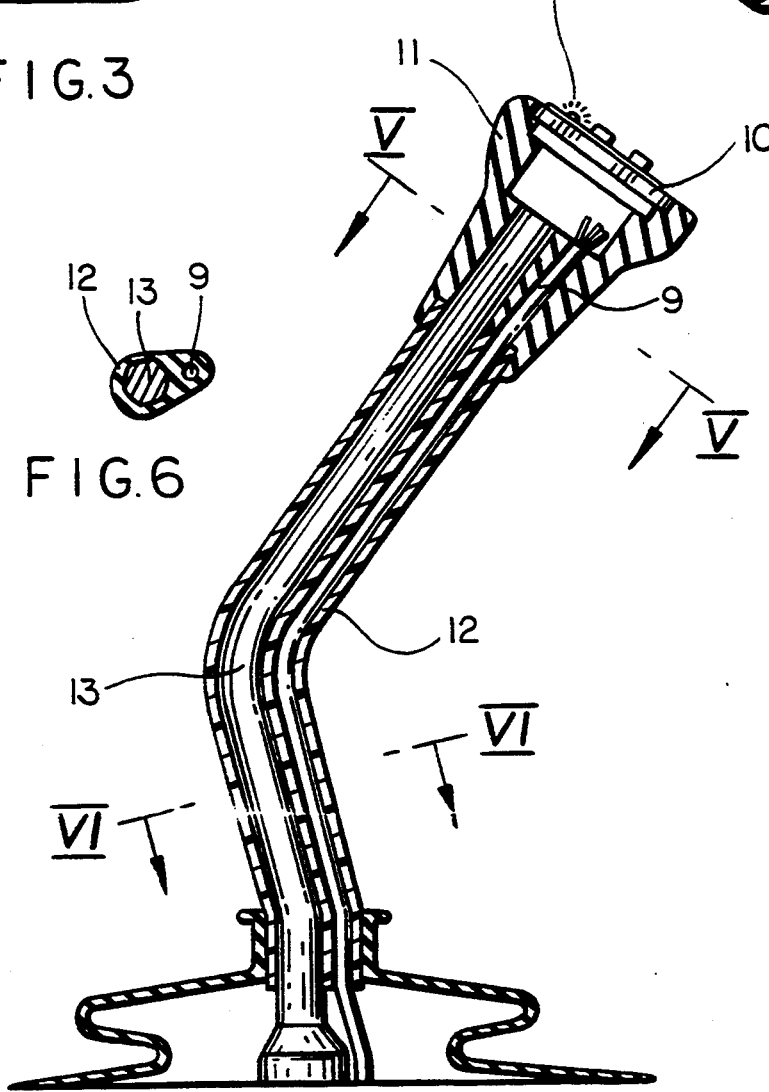
FIG. 4 is a longitudinal cut view of the shift lever and knob.

The assembly of the shift lever transmission, as per FIGS. 4 to 6, is composed by knob 11, the shift lever 13 itself, the keyboard 10, the wiring 9 and the wiring duct 12.

Figure 3:
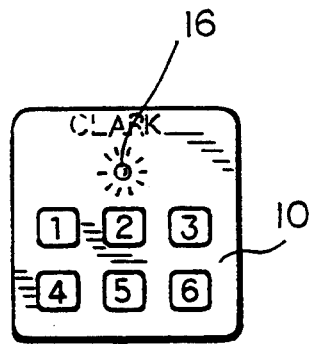
FIG. 3 shows the keyboard on the knob in a front view.

The knob 11, hollow, shields the keyboard 10 in its top section, and facilitates view to the user, and the wiring 9, in its lower section, which conducts necessary information for the actuating of the system, housed in the lever 13 as per FIG. 4. FIG. 5 shows, in crosswise cut, the knob, the lever and the wiring. Covering the lever and the wiring there is a duct 12 which protects and prevents major damages, mainly to the wiring, as the section of FIG. 6. As can be observed in FIG. 3, the keyboard is composed of six digits, from 1 to 6, and one LED 16 for monitoring. The six key allow the user to command the locking (by simply pressing one or more keys) or the unlocking (by the input of his personal and programmable code number), and the LED monitors the situation of the system.

Figure 7A:
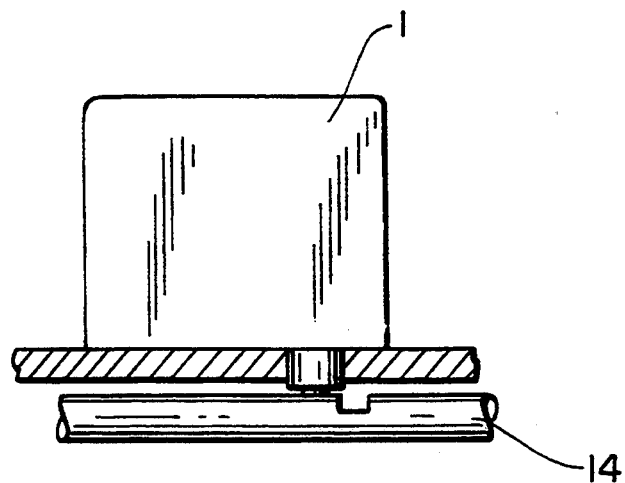
FIGS. 7a to 7e show several actuating diagrams of the locking device on the shifting control system.
Figure 7B:
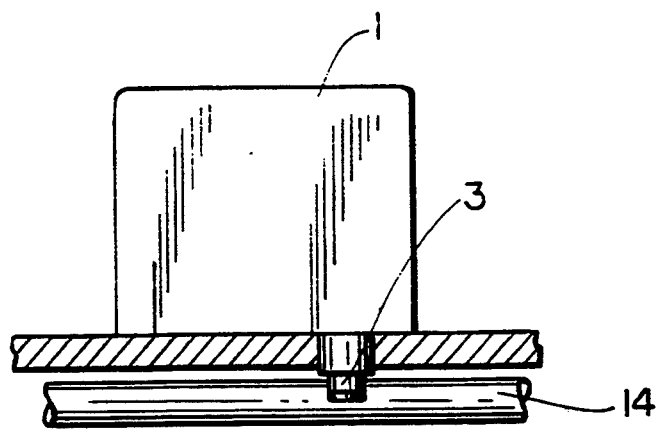

The actuation modes of the pin in the transmission control system are laid out in FIGS. 7a to 7e and described in the sequence:

In FIGS. 7a and 7b the pin 3 is actuating in a slot (which can be just a hole) on the shift bar of the reverse 14. As long as the pin is not advanced, the shift bar will be free to move in both directions (FIG. 7a) but, once the pin is advanced into the slot, the shift bar is locked, thus making it impossible to shift out of mesh (FIG. 7b).

Figure 7C:
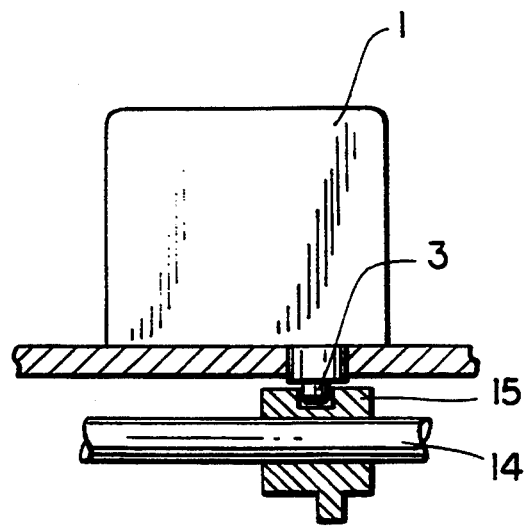

In FIG. 7c pin 3 is actuating in a slot, or hole, in a part 15 which is assembled on the reverse shift bar 14. This part can be the reverse shift fork itself, or the shift finger or even a part assembled on the bar exclusively for this purpose. As in the previous example (FIGS. 7a and 7b), once the pin is advanced into the slot, it is impossible to shift out of mesh.

Figure 7D:
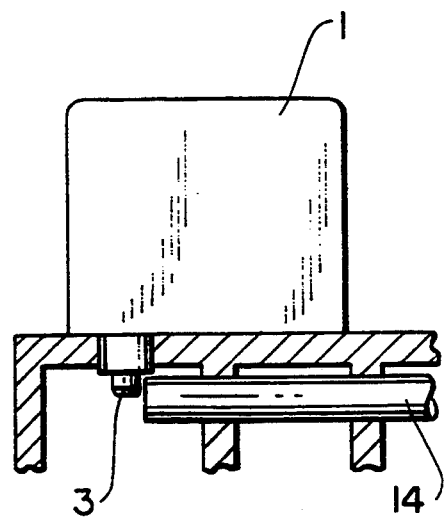
Figure 7E:
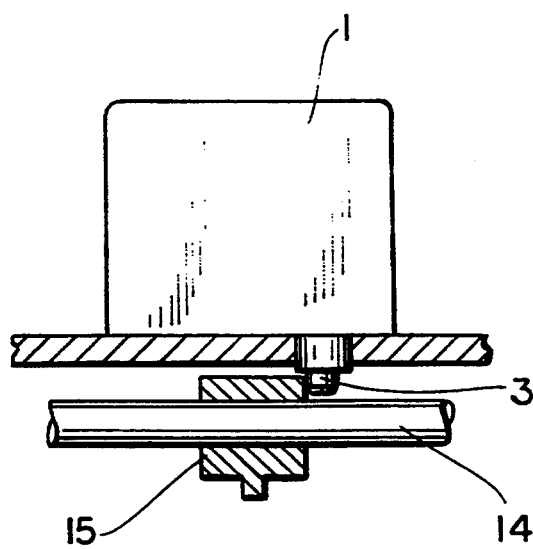

In FIG. 7d, pin 3 is actuating on the reverse shift bar 14, but against one of its ends, and not in a slot or hole, positioned in such a way that once the reverse is in mesh and the pin is advanced, it tops against the end of the bar which can not be moved to out of mesh position, thus locking the transmission. In the same way, FIG. 7e shows pin 3 actuating on the face of a part 15 assembled on the reverse shift bar 14.

The device operates in the manner that is described in the sequence.

The basic conditions necessary to lock or unlock the transmission are: ignition off, reverse in mesh. Without these conditions, it is not possible to change the situation of the transmission.

When the transmission is not locked and observing the basic conditions (ignition off and reverse in mesh) to lock the transmission, for instance, all it takes is to press key number 1 for two seconds. The system immediately blocks the transmission and the LED will flash on and off three times indicating that the transmission is locked. It must be observed that the transmission can be locked only when the ignition is off, thus preventing involuntary locking with the vehicle in operation. There are two codes which command the unlocking of the system: a permanent and a programmable code.

The permanent code is used only to register the programmable code when it is not in the memory of the system (in case of installation or disconnection of the anti-theft shift lock). It should be safely stored by the user, away from the vehicle, thus ensuring that nobody has access to it.

The programmable code, which effectively unlocks the transmission, can be changed at any time, as desired, following these steps: shift into reverse, turn the ignition on, input the old code and, in sequence, input the new code twice. In case the new code is valid, the LED will flash three times, indicating validity of the operation, returning to its previous position. In case the old code was put in the wrong way, or the new code is not valid, the LED will be on for two seconds, indicating operation not valid, and then return to previous position. The great advantage of this programmable code is that it can be changed any time one suspects that it may have been disclosed.

To register the first programmable code number, same steps described above for code change should be followed, using the permanent code number instead of the old one. Observe that both to change the programmable code and to initiate the system, using the permanent code, it is necessary to turn the ignition on, which implies in additional safety, because it is necessary to use the ignition key.

In case the owner forgets the programmable code number, he must disconnect the battery, thus cancelling the memory, and then use the permanent code number to reprogram. Without the permanent code, there could be the risk of having to the vehicle to a dealer for proper corrective actions, in case the programmable code number is forgotten—which would be an undesirable situation. It should be observed that any time that the battery is disconnected for any reason (the circuit becomes inoperative) the system must be started with the information of the programmable code. It is convenient to emphasize that if the circuit is interrupted, because the battery was disconnected, or even because somebodies cut the wiring, the system loses the programmable code, but remains in the mode in which it was, locked or unlocked. With this, if there is an attempt to violate through cutting of the wires, and if the transmission is locked, it will remain in the same mode.

Once the transmission is locked, to unlock it the user must input the code of n digits (LED flashes once with every key pressed). If the code is correct, the reverse is immediately unlocked, the LED flashes three times, indicating that operation is valid, and goes off. If the code is wrong, the LED will be on for two seconds, indicating not valid operation, and will pulsate again, indicating readiness to receive next tentative. In case the user inputs a wrong number, he must wait four seconds, until the system cancels the numbers that had been pressed and the LED will flash twice, indicating that the tentative was cancelled and that it is prepared for the next try.

If the code is wrong for the fifth time in a series, the system sends a signal to actuate the alarm and will become inoperative for 15 minutes.

As already described above, the LED monitors the system as follows:

1—Off, with liberated transmission;
2—Pulsates with transmission locked;
3—Flashes three times every time when the operation is valid;
4—Flashes twice to start inputting in of code over again;
5—Turns on for two seconds to indicate not valid operation;
6—Flashes at every key that is pressed when the reverse is in mesh, and the ignition is off, or when a new code is being programmed;
7—Keeps on when the actuating system is non operative, in case five consecutive attempts are wrong.

I claim:

1. Automotive vehicles anti-theft system characterized by the fact of being a mechanical-electric-electronic system capable of locking the transmission in reverse mesh, comprising: one element denominated locking device (1), mounted on the transmission case, containing locking pin (3) which actuates in the transmission control system, displaced by actuation of a solenoid (4) commanded by relays (5); b) by one keyboard (10) used by the owner of the vehicle to command the release or the locking of the system by means of a personal and programmable code number; and c) one element denominated electronic central (6), which can be installed close with the locking device (1), or close with the keyboard (10) basically composed of a micro-controller (7) which receives information from keyboard (10), conducted by wires in a duct (9) coupled to the shift lever (13) and of two more signals, external to the system, also conducted by wires (8) (ignition and reverse light switch); through the recognition of these signals, an electronic central (6) releases the keyboard (10) to accept the owner's code and, if all items of information are correct, sends a codified electrical signal to the solenoid (4), which will command the system blocking pin (3) to advance or to retrieve.

2. The automotive vehicles anti-theft system of claim 1, characterized by the fact of actuating on the transmission control system locking it in reverse.

3. The automotive vehicles anti-theft system of claim 1, characterized by the fact that the locking device (1) is adapted jointly to the transmission case, and that the actuating pin (3) which effectively locks the control system of the transmission is positioned inside it.

4. The automotive vehicles anti-theft system of claim 1, characterized by the fact that it is actuated by a wireless remote control, that is, a keyboard (10).

5. The automotive vehicles anti-theft system of claim 4, characterized by the fact that the keyboard (10) is assembled on the shift lever (13) and that it has a system monitor by means of a LED (16).

6. The automotive vehicles anti-theft system of claim 1, characterized by the fact that it is actuated by means of a programmable digital code, that is, a code number.

7. The automotive vehicles anti-theft system of claim 6, characterized by the fact that it has two codes, one programmable by the user himself, used to actuate the system and a permanent code, used to register the previous one.

8. The automotive vehicles anti-theft system of claim 1, characterized by the fact that a double action solenoid (4) commands the advance or the retrieval of the actuating pin (3), and that these movements are actuated by means of relays (5).

9. The automotive vehicles anti-theft system of claim 1, characterized by the fact that it includes an electronic circuit composed of a micro-controller (7), actuated by the keyboard (10).

10. The automotive vehicles anti-theft system of claim 1, characterized by the fact that an alarm of the vehicle is actuated in case of an attempt to violate the system.

11. The automotive vehicles anti-theft system of claim 1, characterized by the fact that it maintains its mode, locked or unlocked, in case of violation of the wires (8) or (9).

12. The automotive vehicles anti-theft system of claim 1, characterized by the fact that it is actuated only in the conditions of vehicle with ignition off and gear in mesh, and that the actuation is optional.

* * * * *